(12) United States Patent
Faaborg et al.

(10) Patent No.: US 10,101,803 B2
(45) Date of Patent: Oct. 16, 2018

(54) DYNAMIC SWITCHING AND MERGING OF HEAD, GESTURE AND TOUCH INPUT IN VIRTUAL REALITY

(71) Applicant: GOOGLE INC., Mountain View, CA (US)

(72) Inventors: Alexander James Faaborg, Mountain View, CA (US); Manuel Christian Clement, Felton, CA (US); Chris McKenzie, New York, NY (US)

(73) Assignee: Google LLC, Mountain View, CA (US)

( * ) Notice: Subject to any disclaimer, the term of this patent is extended or adjusted under 35 U.S.C. 154(b) by 354 days.

(21) Appl. No.: 14/836,311

(22) Filed: Aug. 26, 2015

(65) Prior Publication Data

US 2017/0060230 A1    Mar. 2, 2017

(51) Int. Cl.
*G06F 3/01*        (2006.01)
*G06F 3/0484*    (2013.01)
(Continued)

(52) U.S. Cl.
CPC .......... *G06F 3/011* (2013.01); *G02B 27/0172* (2013.01); *G06F 3/012* (2013.01);
(Continued)

(58) Field of Classification Search
None
See application file for complete search history.

(56) References Cited

U.S. PATENT DOCUMENTS 6,243,093 B1 *   6/2001   Czerwinski ......... G06F 3/04815
                                                                707/E17.142

6,570,555 B1       5/2003   Prevost et al.
(Continued)

FOREIGN PATENT DOCUMENTS

EP        2778865 A2      9/2014

OTHER PUBLICATIONS

Arjan JF Kok, Robert van Liere, A Multimodal Virtual Reality Interface for 3D Interaction with VTK, 2007, Knowledge and Information Systems, 13:197-219.*

(Continued)

*Primary Examiner* — Michael J Cobb
(74) *Attorney, Agent, or Firm* — Brake Hughes Bellermann LLP

(57) ABSTRACT

In a system for dynamic switching and merging of head, gesture and touch input in virtual reality, a virtual object may be selected by a user in response to a first input implementing one of a number of different input modes. Once selected, with focus established on the first object by the first input, the first object may be manipulated in the virtual world in response to a second input implementing another of the different input modes. In response to a third input, another object may be selected, and focus may be shifted from the first object to the second object in response to a third input if, for example, a priority value of the third input is higher than a priority value of the first input that established focus on the first object. If the priority value of the third input is less than the priority value of the first input that established focus on the first object, focus may remain on the first object. In response to certain trigger inputs, a display of virtual objects may be shifted between a far field display and a near field display to accommodate a particular mode of interaction with and manipulation of the virtual objects.

22 Claims, 18 Drawing Sheets

(51) Int. Cl.
*G06F 3/041* (2006.01)
*G06F 3/0481* (2013.01)
*G06T 19/00* (2011.01)
*G02B 27/01* (2006.01)
*H04L 29/08* (2006.01)
*G06F 3/0488* (2013.01)

(52) U.S. Cl.
CPC .............. *G06F 3/013* (2013.01); *G06F 3/017* (2013.01); *G06F 3/0416* (2013.01); *G06F 3/04815* (2013.01); *G06F 3/04842* (2013.01); *G06F 3/04847* (2013.01); *G06F 3/04883* (2013.01); *G06T 19/006* (2013.01); *H04L 67/306* (2013.01); *G02B 2027/0178* (2013.01)

(56) References Cited

U.S. PATENT DOCUMENTS

| | | | |
|---|---|---|---|
| 6,611,253 | B1 | 8/2003 | Cohen |
| 6,779,060 | B1 | 8/2004 | Azvine et al. |
| 7,095,401 | B2 | 8/2006 | Liu et al. |
| 7,646,394 | B1 | 1/2010 | Neely et al. |
| 2009/0228841 | A1 | 9/2009 | Hildreth |
| 2010/0241955 | A1* | 9/2010 | Price ..................... G06F 3/0425 715/702 |
| 2012/0113223 | A1 | 5/2012 | Hilliges et al. |
| 2012/0229377 | A1* | 9/2012 | Kim ........................ G06F 3/017 345/157 |
| 2013/0082928 | A1* | 4/2013 | Kim ..................... G06F 3/0425 345/168 |
| 2013/0088419 | A1 | 4/2013 | Kim et al. |
| 2013/0144629 | A1 | 6/2013 | Johnston et al. |
| 2013/0154913 | A1 | 6/2013 | Genc et al. |
| 2013/0283208 | A1* | 10/2013 | Bychkov ................. G06F 3/017 715/810 |
| 2014/0104274 | A1 | 4/2014 | Hilliges et al. |
| 2014/0168261 | A1* | 6/2014 | Margolis ................. G06F 3/011 345/633 |
| 2014/0237366 | A1* | 8/2014 | Poulos .................... G06F 3/011 715/728 |
| 2014/0320389 | A1* | 10/2014 | Scavezze ................ G06F 3/011 345/156 |
| 2014/0362110 | A1 | 12/2014 | Stafford |
| 2015/0054784 | A1* | 2/2015 | Kim ..................... G06F 3/0416 345/174 |
| 2015/0177518 | A1* | 6/2015 | Wong ................... G02B 27/017 345/633 |
| 2015/0193018 | A1 | 7/2015 | Kolya et al. |
| 2015/0212576 | A1 | 7/2015 | Tomlin et al. |

OTHER PUBLICATIONS

Chi-Cheng P Chu, Tushar H Dani, Rajit Gadh, Multi-Sensory User Interface for a Virtual-Reality-Based Computer-Aided Design System, 1997, Computer-Aided Design, 20(10):709-725.*

International Search Report and Written Opinion for PCT Patent Application No. PCT/US2016/039806, dated Dec. 14, 2016, 19 pages.

Kaiser, et al., "Mutual Disambiguation of 3D Multimodal Interaction in Augmented and Virtual Reality", ICMI-PUI '03, Nov. 2003, 8 pages.

Smith, et al., "Use of Eye Movements for Video Game Control", ACE 06, Jun. 2006, 8 pages.

Invitation to Pay Add'l Fees and Partial Search Report for PCT Application No. PCT/US2016/39806, dated Oct. 10, 2016, 7 pages.

* cited by examiner

DYNAMIC SWITCHING AND MERGING OF HEAD, GESTURE AND TOUCH INPUT IN VIRTUAL REALITY

FIELD

This document relates, generally, to the processing of inputs in an immersive virtual reality system.

BACKGROUND

A virtual reality (VR) system may generate a three-dimensional (3D) immersive environment. A user may experience this virtual 3D immersive environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual 3D environment, user interaction with the 3D environment may take various forms, such as, for example, eye gaze, head gaze, physical movement and/or manipulation of an electronic device to interact with, personalize and control the virtual 3D environment.

SUMMARY

In one aspect, a method may include initiating an immersive virtual experience including a plurality of virtual objects, each of the plurality of virtual objects being selectable and manipulatable in response to a plurality of input modes, receiving a first input implementing a first input mode of the plurality of input modes, selecting a first virtual object of the plurality of virtual objects in response to the first input, receiving a second input implementing a second input mode of the plurality of input modes, comparing a priority value of the second input mode and a priority value of the first input mode, and based on the comparison, releasing selection of the first virtual object and shifting selection to a second virtual object of the plurality of virtual objects, or maintaining selection of the first virtual object, in response to the second input.

In another aspect, a method may include initiating an immersive virtual experience, generating a far field display of a plurality of virtual objects, receiving a first input, selecting the far field display including the plurality of virtual objects in response to the first input, receiving a second input, morphing an appearance of the plurality of virtual objects for near field display of the plurality of virtual objects in response to the second input, generating the near field display including the morphed plurality of virtual objects, receiving a third input, and selecting one of the morphed plurality of virtual objects in response to the third input.

The details of one or more implementations are set forth in the accompanying drawings and the description below. Other features will be apparent from the description and drawings, and from the claims.

DETAILED DESCRIPTION

A user immersed in a 3D virtual environment wearing, for example, a head mounted display (HMD) device may explore the 3D virtual environment and interact with the 3D virtual environment through various different types of inputs. These inputs may include, for example, physical interaction including, for example, hand/arm gestures, head movement and/or head directional gaze, eye directional gaze and the like, and/or manipulation of the HMD, and/or manipulation of an electronic device separate from the HMD such as, for example, a touch applied on a touch sensitive surface of the electronic device, a movement of the electronic device, a ray or beam emitted by the electronic device and the like. For example, in some implementations, the HMD may be paired with a handheld electronic device, such as, for example, a smartphone or other such handheld electronic device. User manipulation of the handheld electronic device paired with the HMD may allow the user to interact with the 3D virtual immersive experience generated by the HMD. Some systems may be configured to detect and track the user's eye gaze, and/or to detect directional gaze of the user's head, to translate the detected eye and/or head gaze into a corresponding interaction in the 3D virtual immersive experience. When faced with these multiple different modes of input, and in particular, multiple simultaneous inputs, a set priority sequence, or hierarchy, for execution of the multiple inputs may facilitate the accurate selection of an object and/or action to be taken in the virtual world based on the detected inputs and the set priority sequence or hierarchy.

Figure 1:
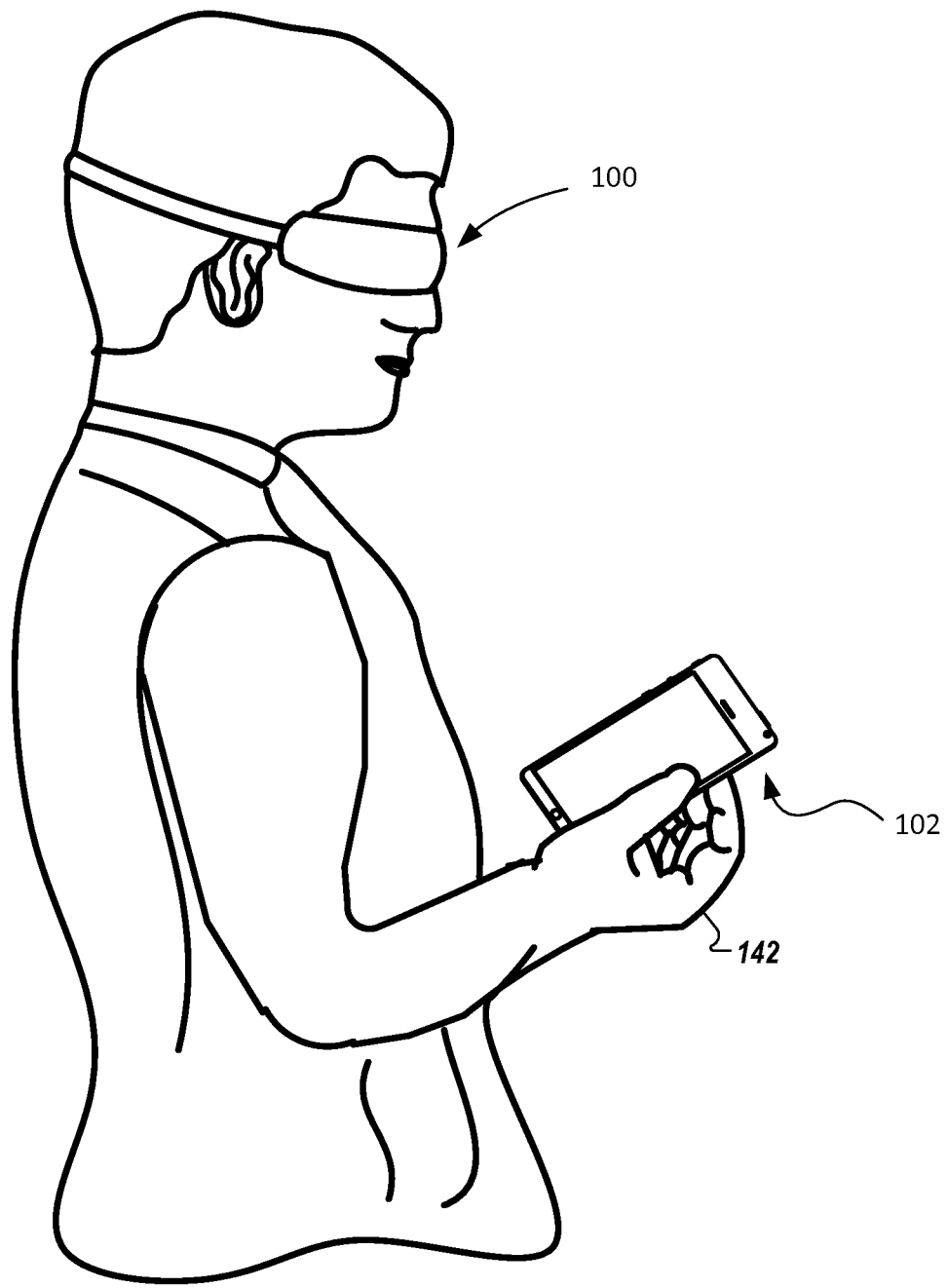
FIG. 1 is an example implementation of a virtual reality system including a head mounted display and a handheld electronic device, in accordance with embodiments as broadly described herein.

In the example implementation shown in FIG. 1, a user wearing an HMD 100 is holding a portable handheld electronic device 102 in his hand 142, such as, for example, a smartphone, or other portable handheld electronic devices that may be paired with, and communicate with, the HMD 100 for interaction in the immersive virtual experience generated by the HMD 100. In the example shown in FIG. 1, the user is holding the handheld electronic device 102 with his right hand. However, the user may also hold the handheld electronic device 102 with his left hand, or with both his left hand and his right hand, and still interact with the immersive virtual experience generated by the HMD 100.

The handheld electronic device 102 as described above may be operably coupled with, or paired with the HMD 100 via, for example, a wired connection, or a wireless connection such as, for example, a wifi or Bluetooth connection. This pairing, or operable coupling, of the handheld electronic device 102 and the HMD 100 may provide for communication between the handheld electronic device 102 and the HMD 100 and the exchange of data between the handheld electronic device 102 and the HMD 100, so that the handheld electronic device 102 may function as a controller in communication with the HMD 100 for interacting in the virtual immersive experience generated by the HMD 100. That is, a manipulation of the handheld electronic device 102, such as for example an input received on a touch surface of the handheld electronic device 102, or a movement of the handheld electronic device 102, or a ray or beam emitted by the handheld electronic device 102 directed by the user may be translated into a corresponding interaction, or movement, in the virtual immersive experience generated by the HMD 100.

Various different types of user inputs may be translated into this type of interaction in the virtual immersive experience generated by the HMD 100. For example, a touch input on a touch surface of the handheld electronic device 102 may correspond to selection of an object in the virtual world, and a touch and drag on the touch surface of the handheld electronic device 102, or a touch and then movement of the handheld electronic device 102 itself, may correspond to selection and movement of the object. In some embodiments, a beam or ray emitted by the handheld electronic device 102 may pointed at a particular object in the virtual world to select the object, with subsequent movement of the beam causing the selected object to also move. In some embodiments, user eye gaze may be monitored and tracked, and the user's gaze directed to an object in the virtual world may correspond to selection of that object. In some embodiments, a subsequent drag on the touch surface of the handheld electronic device 102 and/or movement of the handheld electronic device 102 itself, and/or head movement, and/or hand/arm movement may cause a subsequent action, such as, for example, movement of the object selected by the eye gaze. In some embodiments, user inputs, including initial selection of an object, may be detected from head movements, hand/arm gestures, movement of the handheld electronic device 102 and the like. In an implementation in which these multiple modes of input are enabled, a set priority sequence, or hierarchy, for execution of multiple inputs, for example when received simultaneously, may facilitate the accurate selection of an object and/or action to be taken in the virtual world based on the detected inputs and the set priority sequence or hierarchy.

Figure 2A:
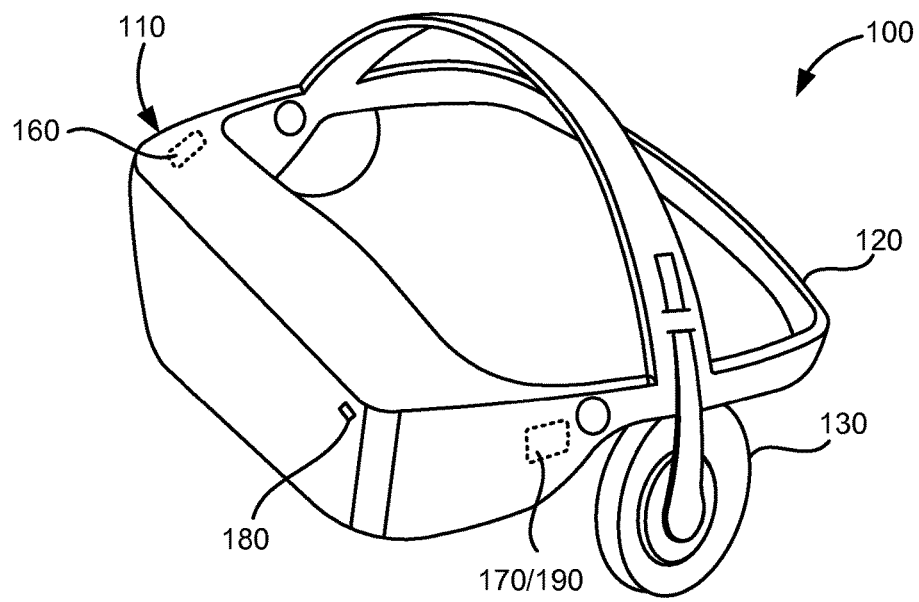
FIGS. 2A and 2B are perspective views of an example head mounted display, in accordance with embodiments as broadly described herein.
Figure 2B:
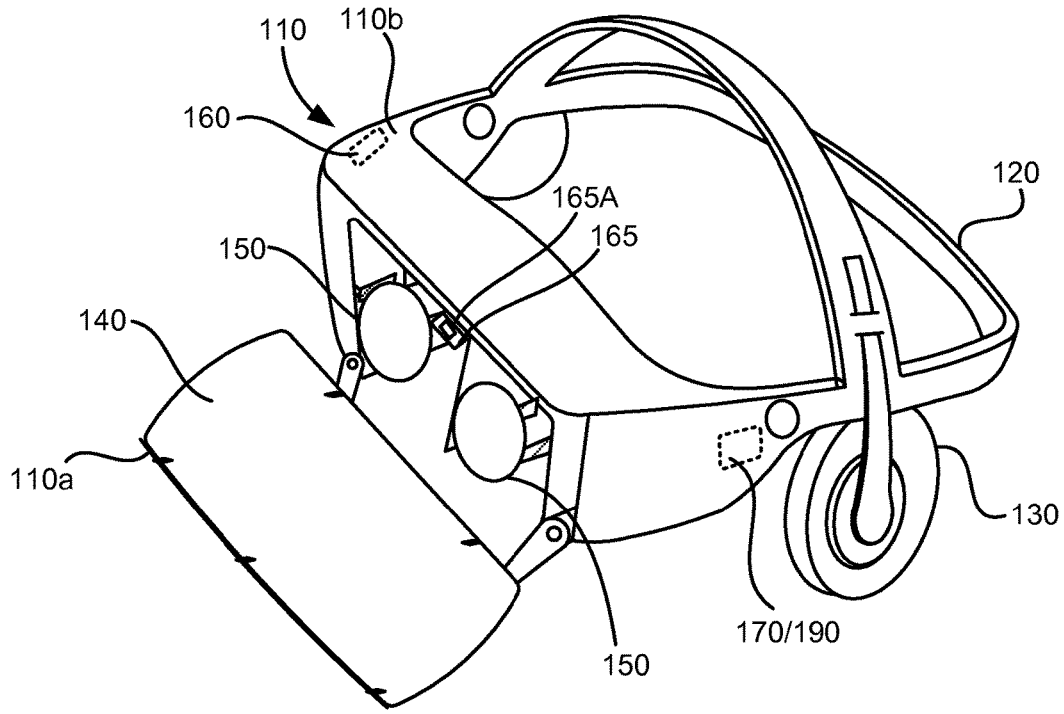

FIGS. 2A and 2B are perspective views of an example HMD, such as, for example, the HMD 100 worn by the user in FIG. 1 to generate an immersive virtual experience. The HMD 100 may include a housing 110 coupled, for example, rotatably coupled and/or removably attachable, to a frame 120. An audio output device 130 including, for example, speakers mounted in headphones, may also be coupled to the frame 120. In FIG. 2B, a front face 110a of the housing 110 is rotated away from a base portion 110b of the housing 110 so that some of the components received in the housing 110 are visible. A display 140 may be mounted on the front face 110a of the housing 110. Lenses 150 may be mounted in the housing 110, between the user's eyes and the display 140 when the front face 110a is in the closed position against the base portion 110b of the housing 110. A position of the lenses 150 may be may be aligned with respective optical axes of the user's eyes to provide a relatively wide field of view and relatively short focal length. In some embodiments, the HMD 100 may include a sensing system 160 including various sensors and a control system 170 including a processor 190 and various control system devices to facilitate operation of the HMD 100.

In some embodiments, the HMD 100 may include a camera 180 to capture still and moving images of the real world environment outside of the HMD 100. The images captured by the camera 180 may be displayed to the user on the display 140 in a pass through mode, allowing the user to temporarily leave the virtual world and return to the real world without removing the HMD 100 or otherwise changing the configuration of the HMD 100 to move the housing 110 out of the line of sight of the user.

In some embodiments, the HMD 100 may include a device to detect and track an eye gaze of the user, or gaze tracking device 165. The gaze tracking device 165 may include, for example, an image sensor 165A to capture images of the user's eyes, and in some embodiments, a particular portion of the user's eyes, such as, for example, the pupil. In some embodiments, the gaze tracking device 165 may include multiple image sensors 165A positioned to detect and track movement of the user's gaze. From the images captured by the image sensor(s) 165A, a direction of the user's gaze may be detected. The detected gaze may essentially define a line of sight from the user's eye to an object, for example, an object in the 3D virtual immersive experience generated by the HMD 100. In some embodiments, the HMD 100 may be configured so that the detected gaze is processed as a user input to be translated into a corresponding interaction in the virtual immersive experience.

Figure 3:
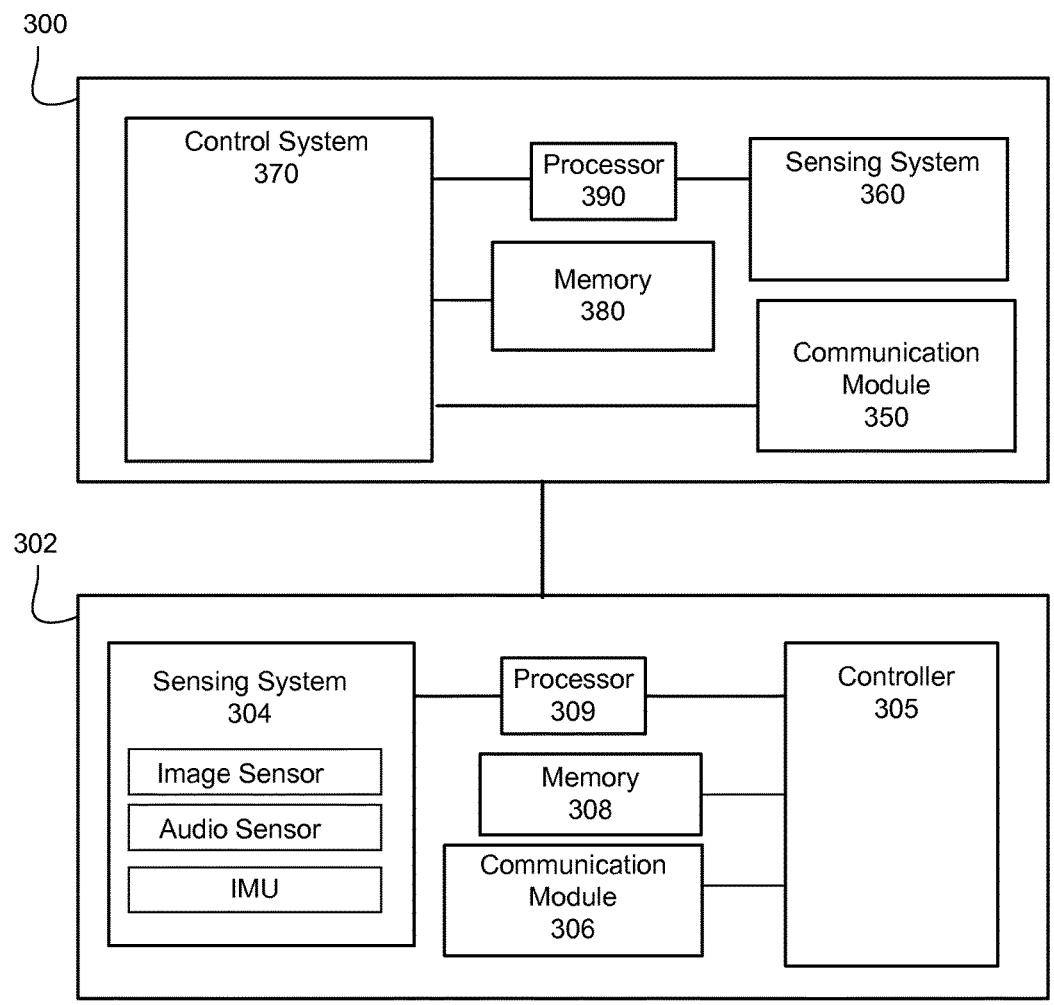
FIG. 3 is a block diagram of a head mounted electronic device and a handheld electronic device, in accordance with embodiments as broadly described herein.

A block diagram of a system for dynamic switching and merging of head, gesture and touch inputs in a virtual reality environment is shown in FIG. 3. The system may include a first user electronic device 300 in communication with a second user electronic device 302. The first user electronic device 300 may be, for example an HMD as described above with respect to FIGS. 1, 2A and 2B, generating an immersive virtual immersive experience, and the second user electronic device 302 may be, for example, a smartphone as described above with respect to FIG. 1, that is in communication with the first user electronic device to facilitate user interaction with the virtual immersive experience generated by the HMD.

The first electronic device 300 may include a sensing system 360 and a control system 370, which may be similar to the sensing system 160 and the control system 170, respectively, shown in FIGS. 2A and 2B. In the example embodiment shown in FIG. 3, the sensing system 360 may include numerous different types of sensors, including, for example, a light sensor, an audio sensor, an image sensor, a distance/proximity sensor, and/or other sensors and/or different combination(s) of sensors. In some embodiments, the light sensor, image sensor and audio sensor may be included in one component, such as, for example, a camera, such as the camera 180 of the HMD 100 shown in FIGS. 2A and 2B. In some embodiments, the sensing system 360 may include an image sensor positioned to detect and track the user's eye gaze, such as, for example, a device similar to the gaze tracking device 165 shown in FIG. 2B. The control system 370 may include numerous different types of devices, including, for example, a power/pause control device, audio and video control devices, an optical control device, a transition control device, and/or other such devices and/or different combination(s) of devices. In some embodiments, the sensing system 360 and/or the control system 370 may include more, or fewer, devices, depending on a particular implementation. The elements included in the sensing system 360 and/or the control system 370 can have a different physical arrangement (e.g., different physical location) within, for example, an HMD other than the HMD 100 shown in FIGS. 2A and 2B.

The first electronic device 300 may also include a processor 390 in communication with the sensing system 360 and the control system 370, a memory 380 accessible by, for example, a module of the control system 370, and a communication module 350 providing for communication between the first electronic device 300 and another, external device, such as, for example, the second electronic device 302 paired to the first electronic device 400.

The second electronic device 302 may include a communication module 306 providing for communication between the second electronic device 302 and another, external device, such as, for example, the first electronic device 300 paired to the second electronic device 302. In addition to providing for the exchange of, for example, electronic data between the first electronic device 300 and the second electronic device 302, in some embodiments, the communication module 306 may also be configured to emit a ray or beam as described above. The second electronic device 302 may include a sensing system 304 including an image sensor and an audio sensor, such as is included in, for example, a camera and microphone, an inertial measurement unit, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As noted above, various types of user inputs may trigger corresponding actions in the virtual immersive experience. Various different mechanisms for user interaction are shown in FIGS. 4A through 10D. The gaze and touch (GT) interaction concept shown in FIGS. 4A-4G and 5A-5D, the point and touch (PT) interaction concept shown in FIGS. 6A-6G, 7A-7C and 8A-8D, and the reach and touch (RT) interaction concept shown in FIGS. 9A-9E and 10A-10D all make use of some combination of four different input mechanisms, including eye gaze, head gaze, touch (for example, a touch on a touch surface of the handheld electronic device 102 and/or tracking of movement of the handheld electronic device 102), and ray or beam emitted by the handheld electronic device 102. Given these four different input mechanisms, a system to disambiguate between which action is to hold the active focus of the system may facilitate the accurate translation of the input into a desired interaction in the virtual world.

The GT type interaction may include a ray-based interaction, including an eye gaze direction, or a head direction, in conjunction with an input entered via a handheld controller, to view, select and manipulate objects in the virtual world. Hereinafter, the term "gaze" will be used to refer to an eye directional gaze and/or a head directional gaze, essentially orthogonal to a forward facing outer plane of the HMD 100.

The example implementation shown in FIGS. 4A-4G illustrates a GT interaction of hover, selection, and scrolling states, directed at a scrollable list of objects X, Y and Z, for example, displayed on the display 140 of the HMD 100 shown in FIGS. 2A and 2B in the virtual world. In this example implementation, the full structure of the HMD 100 is not shown, simply for ease of illustration and explanation. However, in this example implementation, eye gaze may be detected and tracked by, for example, a gaze tracking device 165 including, for example, one or more image sensor(s) 165A as discussed above with respect to FIGS. 2A and 2B. In some embodiments, gaze, and in particular head directional gaze, may be detected by the sensing system 160 of the HMD 100, such as, for example, an accelerometer and/or gyroscope included in the HMD 100.

Figure 4A:
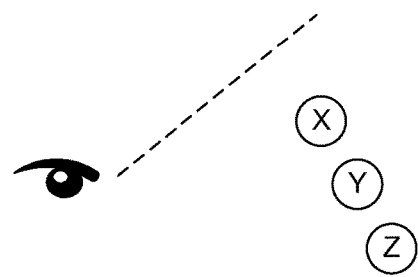
FIGS. 4A-4G illustrate a gaze and touch input for selecting and scrolling through a list of objects, in accordance with embodiments as broadly described herein.
Figure 4B:
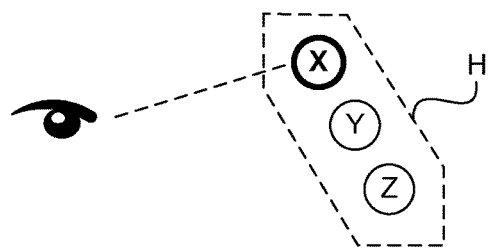
Figure 4C:
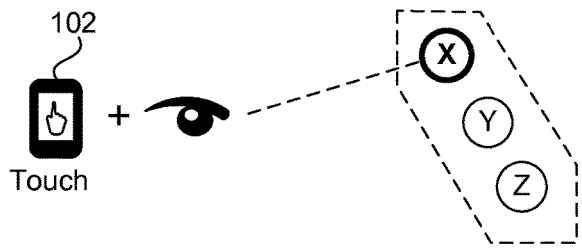
Figure 4D:
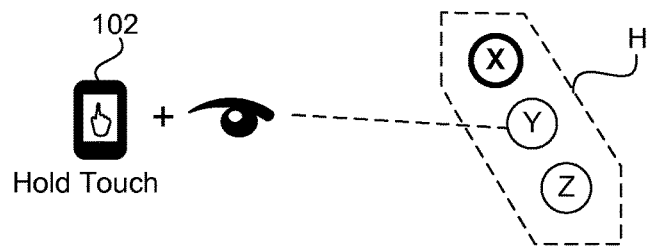
Figure 4E:
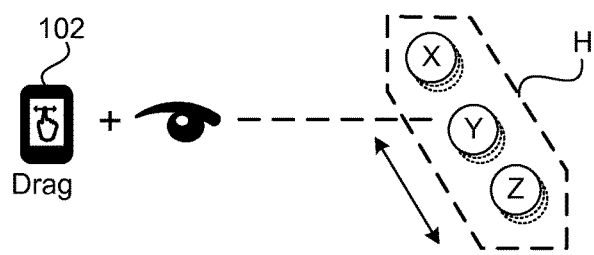
Figure 4F:
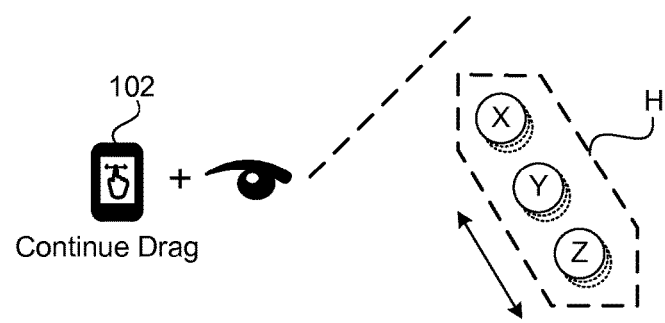
Figure 4G:
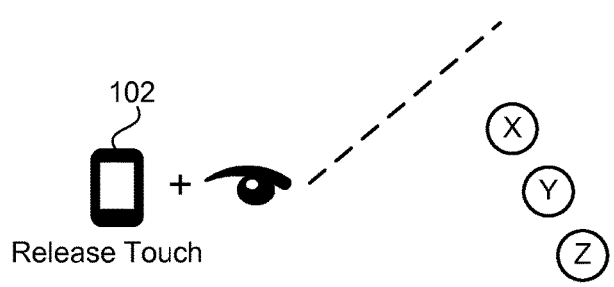

In going from FIG. 4A to 4B, a user shifts his gaze toward the scrollable list of objects X, Y and Z, with the user's gaze intersecting a hit area H surrounding the scrollable list of objects X, Y and Z, with the user's gaze coming to rest on object X, as shown in FIG. 4B. Once the user's gaze rests on object X, the user may then select object X by, for example, a touch input on a touch sensitive surface of the a handheld electronic device 102 paired with the HMD 100, such as, for example, the smartphone 102 as described above, as shown in FIG. 4C. Once the object X has been selected in FIG. 4C, focus main remain on the object X, even if the user's gaze moves away from object X. That is, once object X has been selected by a touch on the touch sensitive surface of the handheld electronic device 102, selected object X remains selected and enabled, even though the user's gaze may shift slightly, as shown in FIG. 4D as long as the touch is held, or maintained, on the touch sensitive surface of the handheld electronic device 102. At this point, a drag input on the touch sensitive surface of the handheld electronic device while gazing within the hit area H of the scrollable list may cause the list to scroll, as shown in FIG. 4E. The list may continue to scroll, as shown in FIG. 4F, even if the user's gaze is no longer directed at the scrollable list, until the user releases the touch/drag input on the touch sensitive surface of the handheld electronic device 102, as shown in FIG. 4G.

Figure 5A:
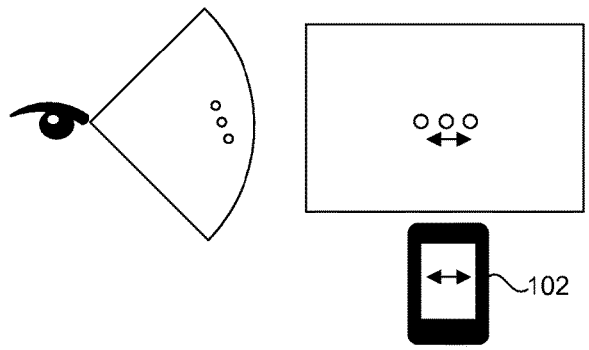
FIGS. 5A-5D illustrate scrolling scenarios using the gaze and touch input shown in FIGS. 4A-4G, in accordance with embodiments as broadly described herein.
Figure 5B:
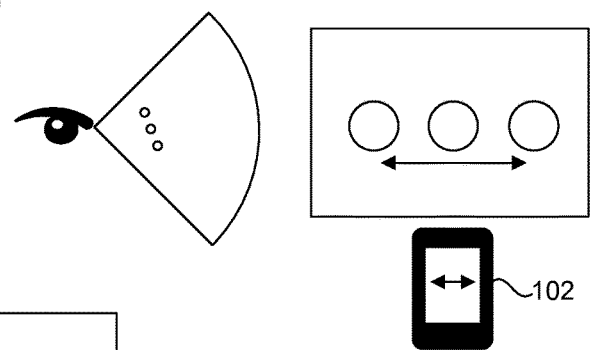
Figure 5C:
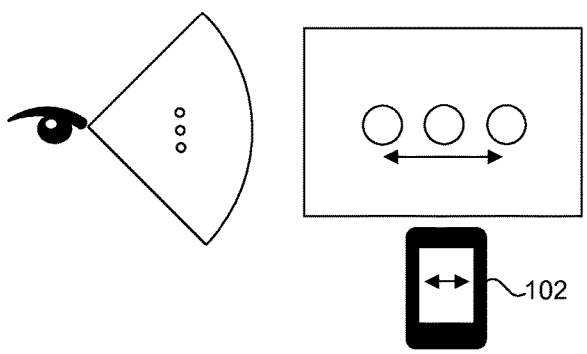
Figure 5D:
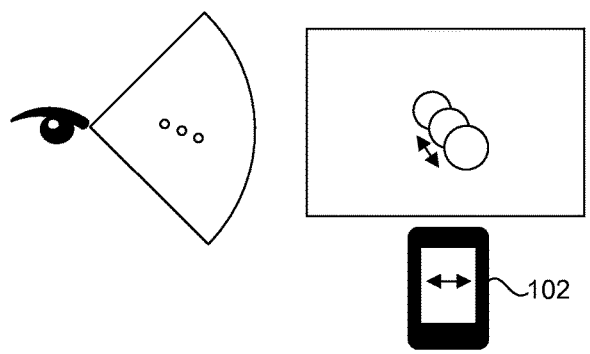

A scrolling action through a list of scrollable and/or manipulatable objects X, Y and Z in the scrollable list, for example, displayed on the display 140 of the HMD 100 shown in FIGS. 2A and 2B, is shown in FIGS. 5A-5D. In the example implementation shown in FIGS. 5A-5D, the plurality of scrollable and/or manipulatable objects may maintain a uniform scroll scale, regardless of the field of view of the user, and/or regardless of the user's orientation, or angle, with respect to the objects. That is, the objects may be in a relatively far our position within the field of view of the user, as shown in FIG. 5A, or the objects may be in a relatively close in position within the field of view of the user, as shown in FIG. 5B. Movement of the list of objects, for example, the list of objects X, Y and Z, displayed, for example on the display 140 of the HMD 100 in the virtual world, may maintain a uniform scroll scale, and be consistent with the drag input on the touch sensitive surface of the handheld electronic device 102, regardless of the position of the objects within the user's field of view. Similarly, the objects may be aligned with the optical axis, or line of sight, of the user, as shown in FIG. 5C, or the objects may be positioned at an angle, or offset, from the optical axis, or line of sight, of the user. Movement of the list of objects, for example, the list of objects X, Y and Z, displayed, for example on the display 140 of the HMD 100 in the virtual world, may maintain a uniform scroll scale, and be consistent with the drag input on the touch sensitive surface of the handheld electronic device 102, regardless of the angle of the objects with respect to the optical axis, or line of sight, of the user.

Point and touch (PT) types of inputs are shown in FIGS. 6A-6F, 7A-7C and 8A-8D. The PT input shown in FIGS. 6A-6G may include selecting an object, or list, and scrolling through objects in the list using the PT type input, the PT input shown in FIGS. 7A-7C may include use of a snap beam, or ray, to cancel selection of an object, and the PT type input shown in FIGS. 8A-8D may include selecting and moving an object using a dynamic push-pull beam. These PT type inputs may include a ray-based interaction with a handheld electronic device 102, such as, for example, the smartphone 102 described above, or other handheld electronic device paired with and in communication with the HMD 100 and/or various other components of a virtual reality system.

Figure 6B:
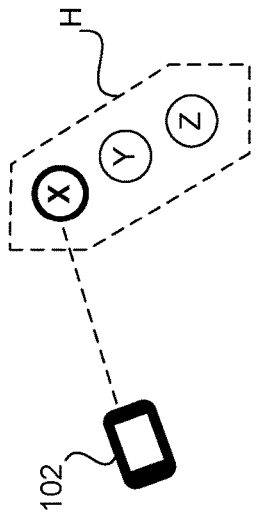
FIGS. 6A-6G illustrate a point and touch input for selecting and scrolling through a list of objects, in accordance with embodiments as broadly described herein.
Figure 6D:
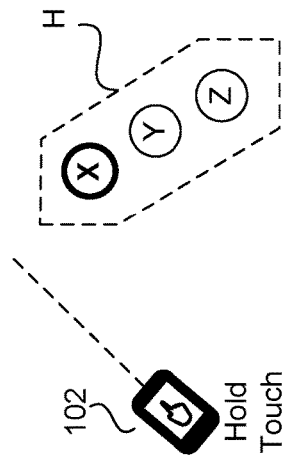
Figure 6A:
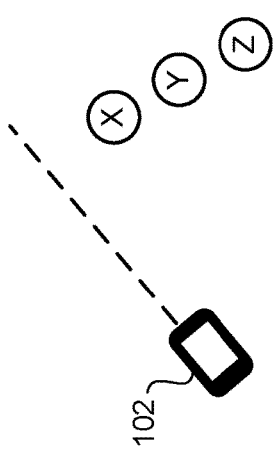
Figure 6C:
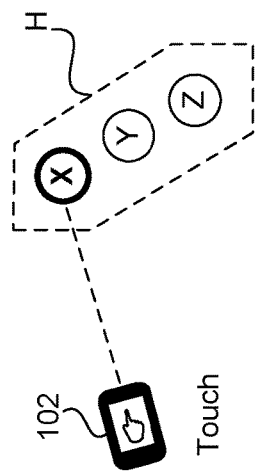
Figure 6G:
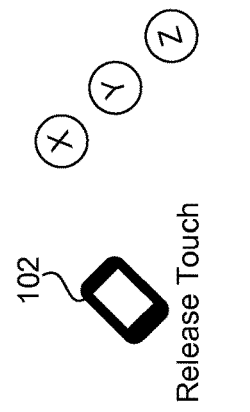
Figure 6F:
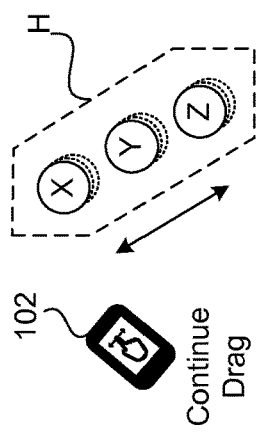
Figure 6E:
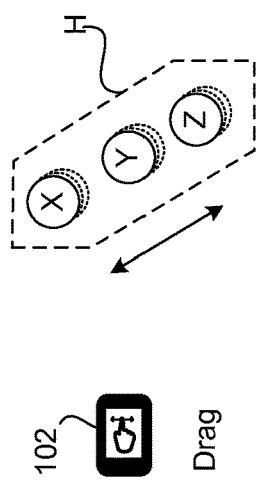

In going from FIG. 6A to 6B, a user shifts focus of a ray emitted by a the handheld electronic device 102 so that the ray emitted by the handheld electronic device intersects the hit area H surrounding the scrollable list of objects X, Y and Z, with the ray coming to rest on and focusing on object X, as shown in FIG. 6B. Once object X is the focus of the ray emitted by the handheld electronic device 102, the user may then select object X by, for example, a touch input on a touch sensitive surface of a handheld electronic device 102 paired with the HMD 100, such as, for example, the smartphone 102 as described above, as shown in FIG. 6C. Once the object X has been selected in FIG. 6C, focus main remain on the object X, even if the ray emitted by the handheld electronic device 102 is no longer pointed at the list, or object X. That is, once object X has been selected by a touch on the touch sensitive surface of the handheld electronic device 102 as shown in FIG. 6C, selected object X remains selected and enabled, even though the direction of the ray emitted by the handheld electronic device 102 may shift, as shown in FIG. 6D, as long as the touch is held, or maintained, on the touch sensitive surface of the handheld electronic device 102. At this point, a drag input on the touch sensitive surface of the handheld electronic device 102 may cause the list to scroll, as shown in FIG. 6E. In some embodiments, ray visualization may change appearance or disappear as the list scrolls in response to the drag input. The list may continue to scroll, as shown in FIG. 6F until the user releases the touch/drag input on the touch sensitive surface of the handheld electronic device 102, as shown in FIG. 6G.

Figure 7A:
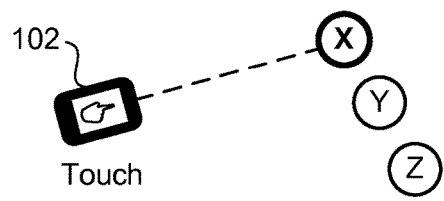
FIGS. 7A-7C illustrate release of a selected object in the point and touch input scenarios shown in FIGS. 6A-6G, in accordance with embodiments as broadly described herein.
Figure 7B:
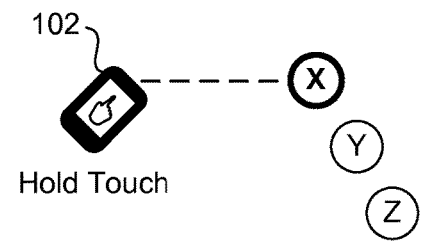
Figure 7C:
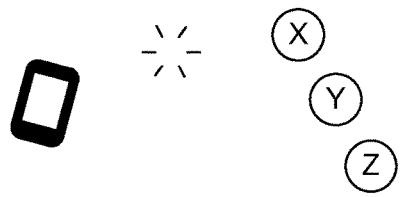

A PT gesture to snap the ray from a selected object X to release, or cancel, the selection of object X is shown in FIGS. 7A-7C. With the ray emitted by the handheld electronic device 102 focused on object X, as shown in FIG. 7A, the user may move, or re-orient the handheld electronic device 102 in a manner that would shift the focus of the ray well away from the object A, and well outside the hit area D of the scrollable list, as shown in FIG. 7B, and then release the touch on the touch sensitive surface of the handheld electronic device 102, as shown in FIG. 7C. In this manner, if the user establishes focus and touches the touch sensitive surface of the handheld electronic device to establish focus on the object X, angling the handheld electronic device 102 sufficiently away from the object X may release the focus, and/or cancel the selection, without necessarily releasing the touch.

Figure 8A:
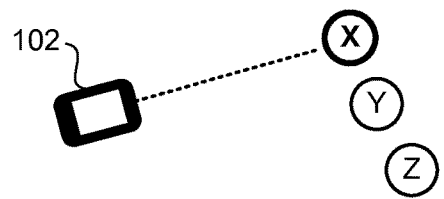
FIGS. 8A-8D illustrate a point and touch input for selecting and moving an object, in accordance with embodiments as broadly described herein.
Figure 8B:
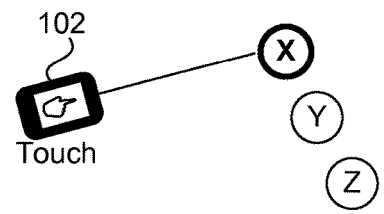
Figure 8C:
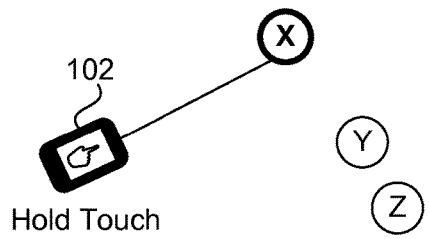

FIGS. 8A-8D illustrate a PT mode that allows for dynamic push-pull rod manipulation of objects, for example, objects X, Y and Z displayed on the display 140 of the HMD 100 shown in FIGS. 2A and 2B, and/or various other components of a virtual reality system. As shown in FIG. 8A, a ray, or pointer beam, generated by the handheld electronic device 102 may extend to, or point to, the object X. With the pointer beam focused on the object X, a press or touch on the touch sensitive surface of the handheld electronic device 102 may establish the pointer beam at a fixed length (attached to the object X) while grabbing the object X. The object X, grabbed by the pointer beam, may then be moved as the handheld electronic device 102 is moved and the user's touch is maintained on the touch sensitive surface of the handheld electronic device 102, as if it were attached to the distal end of a push-pull rod, as shown in FIG. 8C. The object X may be released when the user's touch is released from the touch sensitive surface of the handheld electronic device 102.

A Reach and Touch (RT) type of input is shown in FIGS. 9A-9E and 10A-10D. These RT type inputs may include proximity-based interaction using, for example, the user's hand or hands, and/or a handheld electronic device, to select and manipulate objects. In particular, the RT type input shown in FIGS. 9A-9E illustrates selecting an object or list, and scrolling through object in the list, and the RT type input shown in FIGS. 10A-10D illustrates selecting an object and moving the selected object.

Figure 9B:
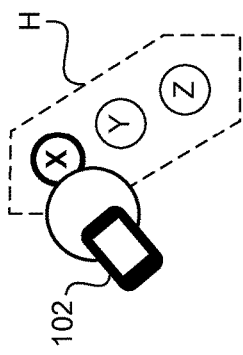
FIGS. 9A-9E illustrate a reach and touch input for selecting and scrolling through a list of objects, in accordance with embodiments as broadly described herein.
Figure 9E:
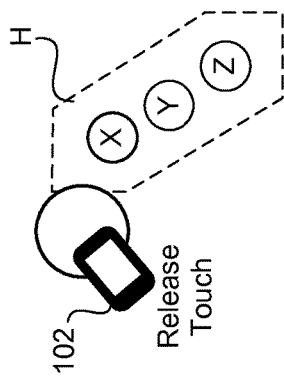
Figure 9A:
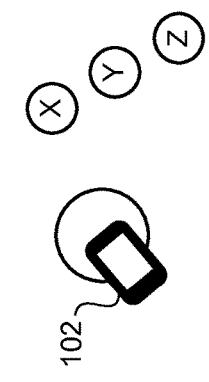
Figure 9D:
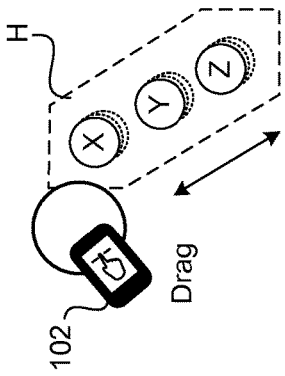
Figure 9C:
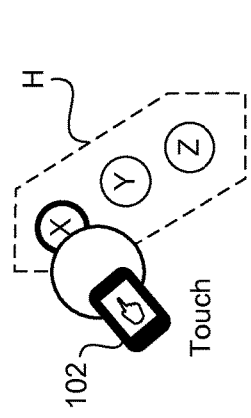

FIGS. 9A-9E illustrate an RT interaction including hover, selection, and scrolling of a nested scrollable list of objects X, Y and Z. In going from FIG. 9A to FIG. 9B, as the user moves his hand and/or handheld electronic device 102 toward the list of scrollable objects X, Y and Z, an object in closest proximity to, for example, the hand of the user, or the end of the handheld electronic device is highlighted (in this case, object X), as shown in FIG. 9B. In some embodiments, a length of the beam emitted by the electronic handheld device 102 may be visually decreased, to provide an additional visual indication of a potential connection of the object to the hand or to the handheld electronic device 102. A preset gesture with the user's hand, such as, for example, a grasping motion and the like, or a touch on the touch sensitive surface of the handheld electronic device 102 may then select the highlighted object in closest proximity (object X in this example), as shown in FIG. 9C. A pulling motion on the scrollable list may then trigger the list to scroll through the objects X, Y and Z, as shown in FIG. 9D, until the hand grasp and/or the touch on the touch sensitive surface of the handheld electronic device is released, as shown in FIG. 9E.

Figure 10A:
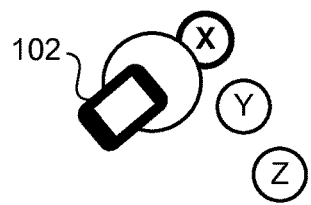
FIGS. 10A-10D illustrate a release and touch input for selecting and moving an object, in accordance with embodiments as broadly described herein.
Figure 10B:
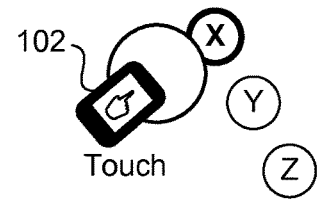
Figure 10C:
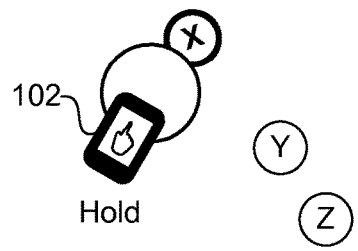
Figure 10D:
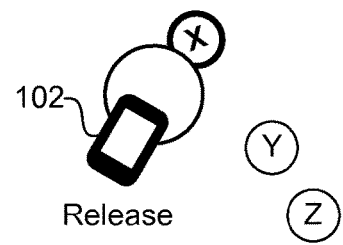

FIGS. 10A-10D illustrate the RT type input for selecting and moving a movable object. In going from FIG. 10A to FIG. 10B, as the user moves his hand and/or handheld electronic device 102 toward the list of scrollable objects X, Y and Z, an object in closest proximity to, for example, the hand of the user, or the end of the handheld electronic device 102, is highlighted (in this case, object X), as shown in FIG. 10B. A preset gesture with the user's hand, such as, for example, a grasping motion and the like, or a touch on the touch sensitive surface of the handheld electronic device 102, may then select the highlighted object in closest proximity (object X in this example), and once grasped, the object may be moved as the user moves his hand and/or the handheld electronic device 102, as shown in FIG. 10C. In some embodiments, the selected object may remain at a fixed translation offset relative to the user's hand, or the end of the handheld electronic device 102, while the object moves as the user's hand and/or handheld electronic device 102 moves while the object remains selected. Upon release of the user's grasp, and/or release of the user's touch on the touch sensitive surface of the handheld electronic device 102, the object may be relocated at the released position, as shown in FIG. 10D. In some embodiments, the released object may be aligned with an established grid or nearby objects.

A variety of different approaches may be taken to differentiating how the various different types of inputs take precedence when establishing focus on a first object, releasing focus from the first object and shifting focus to a second object in the virtual world. That is, as described above, in some embodiments, initial focus may be established on a specific object to be selected by, for example, eye gaze or head gaze, as in the gaze examples shown in FIGS. 4A through 5D. In some embodiments, initial focus may be established on a specific object to be selected by, for example, a point of a ray or beam emitted by the handheld electronic device 102 and directed to an object to be selected for focus, as in the point examples shown in FIGS. 6A through 8D. In some embodiments, initial focus may be established on a specific object to be selected by, for example, a reaching action, such as with the handheld electronic device 102 and/or the user's hand, as in the reach examples shown in FIGS. 9A through 10D. Focus is not released and shifted to a different object until a particular action is taken to release and shift focus. In some embodiments, focus may be released when it is determined that focus has shifted to another object, based on an action implementing one of the input modes discussed above. Simply for ease of discussion and illustration, four example input modes for establishing focus on an object (head gaze, eye gaze, point and reach) will be referred to simply as four different input modes A, B, C and D.

In differentiating between multiple inputs to determine the object that currently has focus, if focus was just recently achieved using a first input mode (for example, head gaze, eye gaze, ray emitted by handheld electronic device 102, touch on the touch sensitive surface of the handheld electronic device, reach/touch gesture, and the like), then that first input mode may take precedence over the other input modes. This mode of establishing a priority amongst the multiple input modes may be referred to as recency. For example, if the handheld electronic device 102 is used to establish focus and select an object, and the user continues to shift gaze to view other objects presented on the display, input via the handheld electronic device 102 may continue to take precedence, or priority, over the user's gaze, because the handheld electronic device 102 was just recently in use. However, if the handheld electronic device 102 is then in some way disengaged (set aside, turned off, taken out of range and the like), the user's gaze (or another input mode) may then cause focus to shift to another object, as there is no longer recent use of the handheld electronic device 102.

In some embodiments, a fixed priority approach may be used to differentiate and establish a priority amongst the various different types of inputs A, B, C and D. For example, in some embodiments, each of the input modes A, B, C and D may be assigned a priority value. For example, the four input modes A, B, C and D may be assigned a priority value, for example, 1, 2, 3 or 4, with the input mode assigned priority value 4 being the highest priority input mode and the input mode assigned priority value 1 being the lowest priority input mode, and with no two of the input modes being assigned the same priority value. In some embodiments, these priority values for the different input modes A, B, C and D may be established as a factory setting. In some embodiments, these priority values for the different input modes A, B, C and D may be set by the user, for example, for a particular HMD 100 and handheld electronic device 102 pairing, or in a user profile specific to the particular user. In some embodiments, these priority values may vary and/or be re-set by the system or by the user, for example, for a particular virtual environment and the like.

Figure 11:
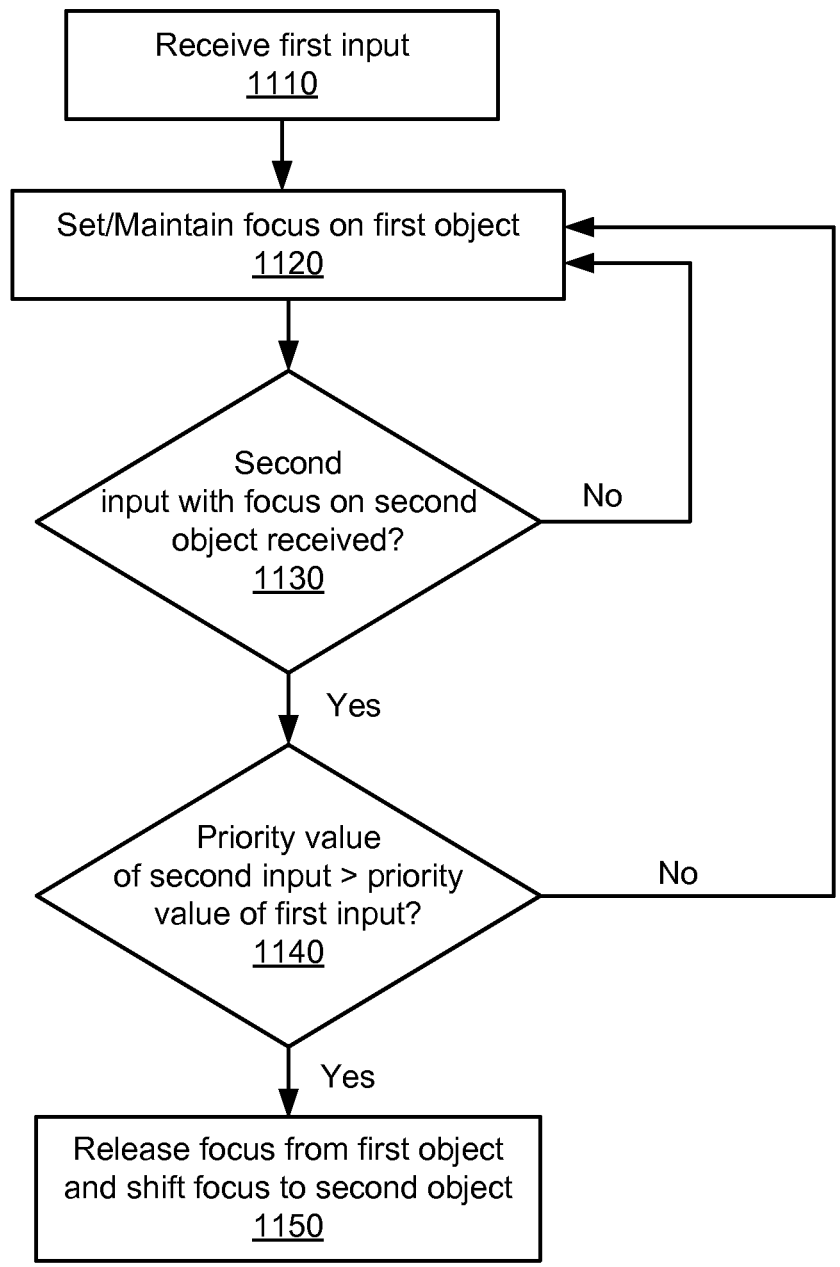
FIG. 11 is a flowchart of a method of setting, releasing and shifting focus between objects in a virtual reality environment, in accordance with embodiments as broadly described herein.

As shown in FIG. 11, focus may be set and maintained on a first object at block 1120 based on receiving a first input at block 1110. If a second input focused on a second object is received at block 1130, it is determined, at block 1140, whether the priority value of the second input is greater than the priority value of the first input which established focus on the first object. If the priority value of the second input is greater than the priority value of the first input, it is determined that, by implementing the input mode associated with the second input, the user intends to shift focus to the second object, and focus is released from the first object and shifted to the second object. If the priority value of the second input is less than the priority value of the first input, focus is maintained on the first object. This methodology may be applied when determining which input, of multiple inputs, is to take precedence in releasing, shifting and establishing focus, when multiple input modes, such as modes A, B, C and D each having an associated priority as described above, are available to a user.

Figure 8D:
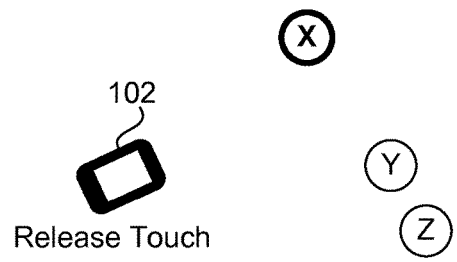

In this manner, focus may be released from the first object X and shifted to the second object Y, without, for example, a specific release action, such as releasing a touch/drag on the touch surface of the handheld electronic device 102, as shown in FIGS. 4G and 6G, releasing the snap hold as shown in FIG. 7C, releasing the push-pull rod as shown in FIG. 8D, or releasing the grasp/reach as shown in FIGS. 9E and 10D.

In some embodiments, an adaptive priority approach may be used to differentiate and establish a priority amongst the various different input modes A, B, C and D. For example, in some embodiments, a priority value may be determined for each of the input modes A, B, C and D based on actual usage, with the input mode most frequently implemented for establishing focus on an object being assigned the highest priority value, and the input mode least frequently implemented for establishing focus on an object being assigned the lowest priority value. In some embodiments, the priority values assigned to each of the input modes may change based on usage. For example, in some embodiments, the priority values may be periodically updated, either automatically or manually, based on usage during a particular period, or a particular virtual experience or game and the like. The method shown in FIG. 11 may be implemented using these adaptive priority values for releasing and shifting focus in a similar manner to what is described above with respect to the fixed priority values.

In some embodiments, target size, for example, size of the focus object, may determine priorities for the different input modes A, B, C and D. For example, in some embodiments, a relatively small target object in the virtual world may assign a higher priority to a point input (as in FIG. 6B) or a reach/touch input (as in FIG. 9B) to establish focus on the target object than to a head gaze or eye gaze input. In some embodiments, a relatively larger target object in the virtual world may assign a higher priority to a gaze input (either a head gaze or an eye gaze, as in FIG. 4B) to establish focus on the target object that it assigns to a point input or reach/touch input. Thus, in some embodiments, each of the different objects, or groups of objects, of a particular virtual immersive environment may assign its own set of priorities for the different input modes, based on a characteristic of the object (or group of objects), such as size of the object(s). The method shown in FIG. 11 may be implemented using these adaptive priority values for releasing and shifting focus in a similar manner to what is described above with respect to the fixed priority values.

In some embodiments, a distance, for example, a distance an object appears to be from the user in the virtual world, may determine priorities for the different input modes A, B, C and D. For example, in some embodiments, an object that appears to be relatively close to the user in the virtual world may assign a higher priority to a reach/touch input (as in FIG. 9B) to establish focus on the relatively close object than it assigns to a point input or a gaze input. In some embodiments, an object that appears to be relatively far from the user in the virtual world may assign a higher priority to a point input (as in FIG. 6B) or a gaze input (a head gaze or an eye gaze, as in FIG. 4B) to establish focus on the relatively far object than it assigns to a reach/touch input. Thus, in some embodiments, each of the different objects, or groups of objects, of a particular virtual immersive environment may assign its own set of priorities for the different input modes, based on a characteristic of the object (or group of objects), such as a perceived distance of the object(s) from the user. The method shown in FIG. 11 may be implemented using these adaptive priority values for releasing and shifting focus in a similar manner to what is described above with respect to the fixed priority values.

In some embodiments, an object, or set of objects, that appears relatively far from the user in the virtual world may be selected by, for example, an eye gaze or a head gaze as discussed above. To facilitate user interaction with the object(s) at a relatively far distance from the user in the virtual world, the user may wish to draw the object(s) closer, for interaction and/or manipulation using one of the other input modes, such as, for example, a reach gesture in which the user's hand is tracked by the HMD 100 and the detected hand movement translated into with the user's hand and/or the handheld electronic device 102. This dynamic switching between the longer distance gaze input interaction and the shorter distance touch or reach interaction may be triggered by various different user inputs, or actions, or signals. For example, in some embodiments, after focus is established on the object(s) with the gaze input, the object(s) may be drawn closer, for example for reach/touch interaction, by a touch input on the touch sensitive surface of the handheld electronic device 102, by a movement of the handheld electronic device 102 within the six degree of freedom (6DOF) space in which the system is operated, by interaction with a control component of the HMD 100 and the like.

In some embodiments, after focus is established on the object(s) with the gaze input, the object(s) may be drawn closer, for example for reach/touch interaction and/or more granular or expanded visualization, by a gesture recognized by the HMD 100 as a command to draw the objects into a visual reach and/or touch range. In some embodiments, the gesture recognized by the HMD 100 may be, for example, a hand and/or arm gesture, detected, for example, by a sensor, such as, for example, the camera 180, of the HMD 100 and processed by the processor 190 and/or controller 170 of the HMD 100. Simply for ease of discussion and illustration, hereinafter, a user gesture including a hand/arm gesture reaching toward the object(s) of focus that appear to be relatively far from the user in the virtual world will be discussed as the trigger for this dynamic switching from longer distance eye gaze input for establishing focus and the shorter distance reach/touch input for manipulating and/or interacting in the virtual world based on the object of focus. However, other triggers, including other gestures, may also cause this type of dynamic switching.

Figure 12A:
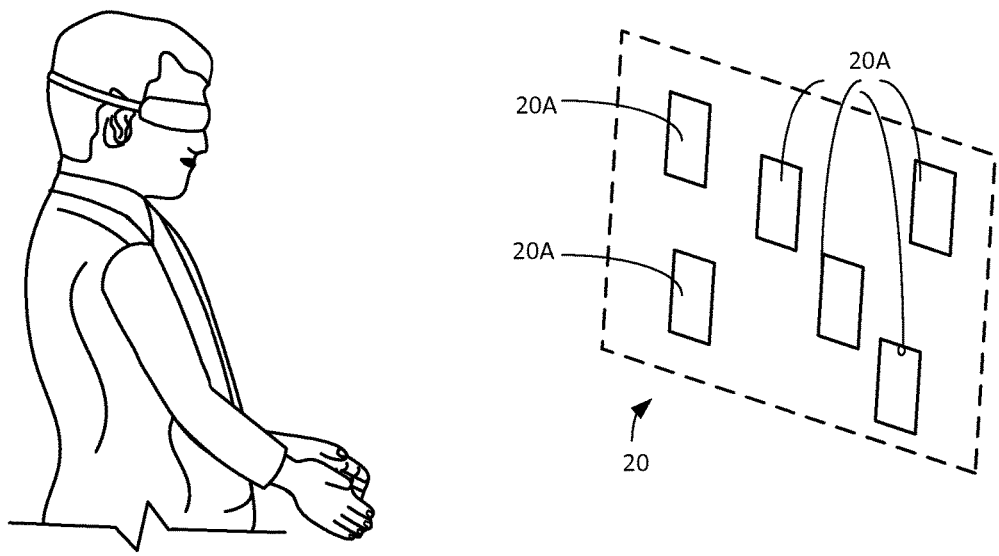
FIGS. 12A-12F illustrate dynamic switching between user input modes in a virtual reality environment, in accordance with embodiments as broadly described herein.
Figure 12B:
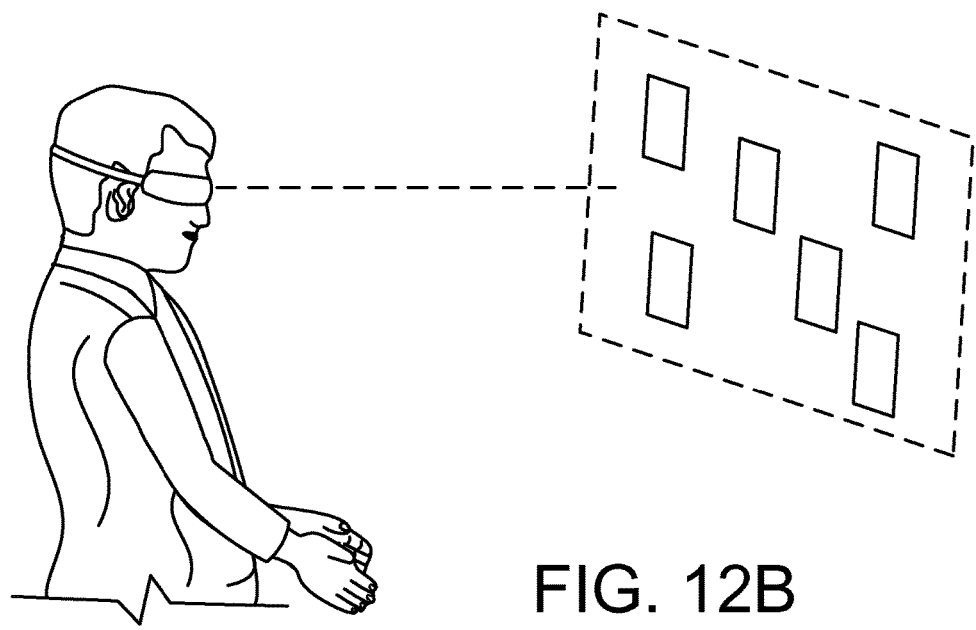
Figure 12C:
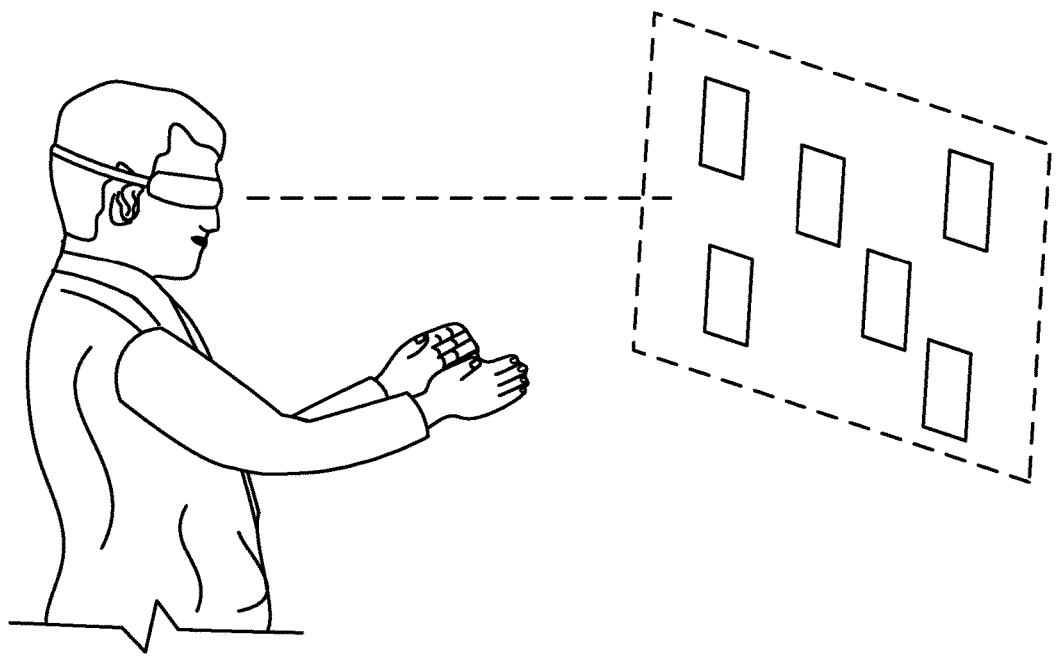
Figure 12D:
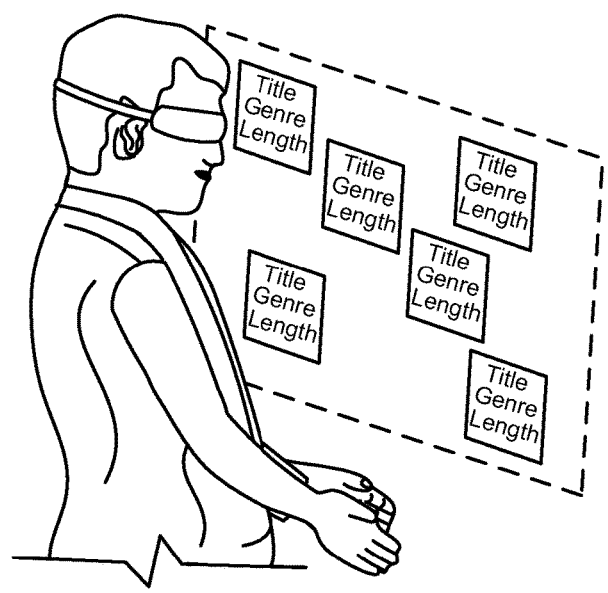
Figure 12E:
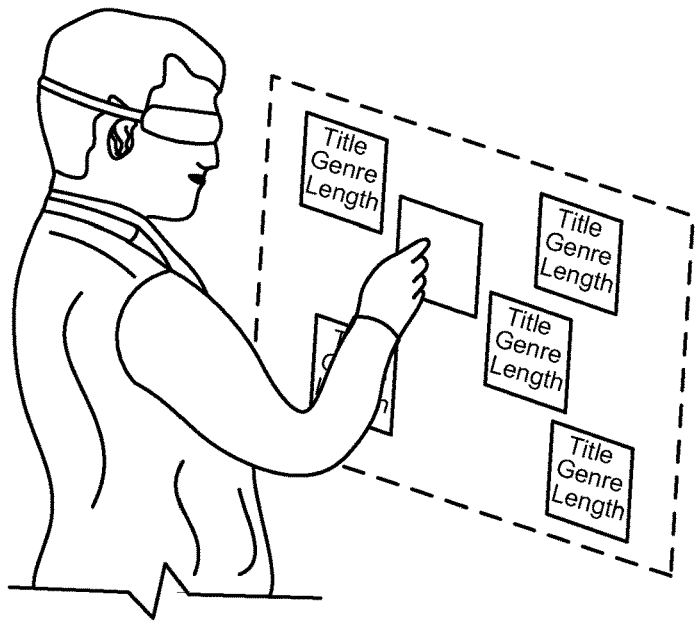
Figure 12F:
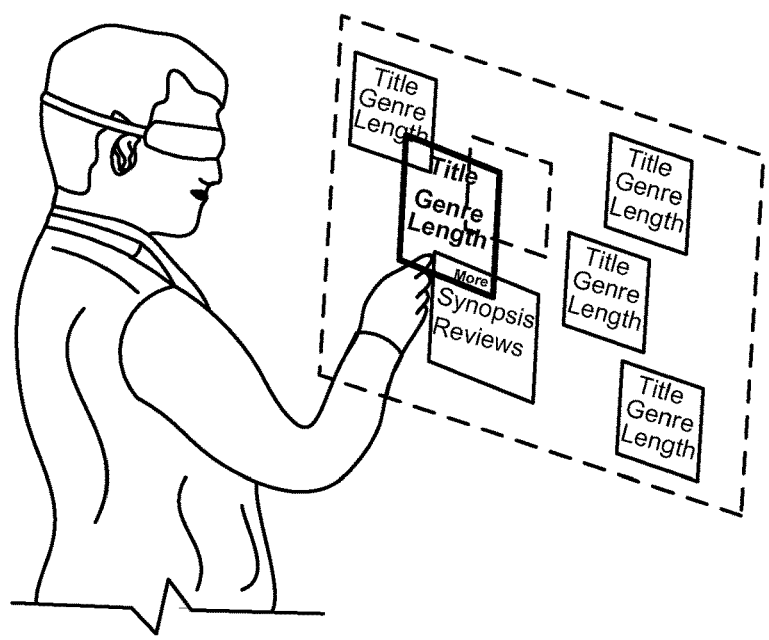

An example of this type of dynamic switching is shown in FIGS. 12A-12G. In FIG. 12A, a user interface is presented to the user. The example user interface shown in FIG. 12A is a list 20, or group, of objects 20A presented in a far field display. That is, in this example implementation, the user interface may be presented to the user as if on a wall at a relatively far distance from the user in the virtual world. In some embodiments, the far field display of the list 20 of objects may appear as if they are, for example, at a distance of 8 feet, or greater than 8 feet, from the user in the virtual world. In some embodiments, the far field display of the list 20 of objects may appear as if they are, for example, at a distance of less than 8 feet from the user in the virtual world. As the user's gaze (head gaze, or eye gaze) intersects the user interface, and in particular, the list 20 of objects 20A, as shown in FIG. 12B, the user's focus may be established on the list 20 of objects 20A as described above. Once focus is established on the list 20 of objects 20A, a trigger action, such as, for example, a user hand/arm gesture as shown in FIG. 12C, may trigger dynamic switching from the longer distance gaze input mode (directed to the far field display of objects) to the shorter distance reach/touch input mode, drawing the list 20 of objects 20A closer to the user, in a near field display, to facilitate reach and/or touch input, as shown in FIG. 12D. The user may then reach out and select an object 20A from the list 20 of objects 20A, as shown in FIG. 12E, so that the user may interact with and/or manipulate the object 20A with a reach/touch input, as shown in FIG. 12F. In some embodiments, the near field display of the list 20 of objects may appear as if they are, for example, at a distance of approximately 1.5 feet, or less than 1.5 feet, from the user in the virtual world. In some embodiments, the near field display of the list 20 of objects may appear as if they are, for example, at a distance of approximately greater than 1.5 feet from the user in the virtual world.

In some embodiments, as the objects 20A are drawn closer to the user in response to the dynamic switching trigger, and the objects 20A transition from the far field display shown in FIGS. 12A-12C to the near field display shown in FIGS. 12D-12F, one or more of the objects 20A may morph, or change form, to include additional features, information, granularity and the like to facilitate user selection, interaction with and manipulation of the objects. In the example shown in FIGS. 12A-12F, the example objects 20A of the list 20 shown in FIGS. 12A-12C may be images associated with, for example, a list of movie titles and/or book titles and/or game titles. As the list 20 is drawn closer to the user for reach and/or touch interaction, the objects 20A in the list 20 may morph to facilitate user selection and interaction, as shown in FIGS. 12D-12F. In this example, in which the objects include movie titles and/or book titles and/or game titles, the objects 20 may morph to include, for example, the full title, a still and/or moving image associated with the title, a genre associated with the title, a length (run time, number of pages and the like) associated with the title, and other features that may facilitate user selection and/or interaction.

In some embodiments, as the objects 20A are drawn closer to the user in response to the dynamic switching trigger, and the objects 20A transition from the far field display shown in FIGS. 12A-12C to the near field display shown in FIGS. 12D-12F, and the objects 20A morph as discussed above, the objects 20A may also animate and visually move from the far field display to the near field display. Animation of the objects as they move, and morph, between the far field display and the near field display, may provide a visual indicator to the user of the changes in progress in the list 20 of objects 20A and maintain engagement of the user.

The list 20 of objects 20A included in the example implementation shown in FIGS. 12A-12F includes titles (movie titles, book titles, game titles and the like), simply for ease of discussion and illustration. However, the dynamic switching described above may also be applied to lists including numerous other different types of objects, such as, for example, virtual game pieces and equipment, items in a virtual shopping environment, and numerous other instances in which dynamic switching, from a longer distance gaze input mode to a shorter distance reach/touch input mode may facilitate user interaction with objects in the virtual world.

Further, in the example implementation shown in FIGS. 12A-12F, the selection of an object 20A from the list 20 of objects 20A, as well as the interaction with and manipulation of the selected object 20A is done with the user's hand. However, the interaction with and manipulation of the selected object 20A may also be done with the handheld electronic device 102, as described above with respect to FIGS. 9A-10D.

Figure 13:
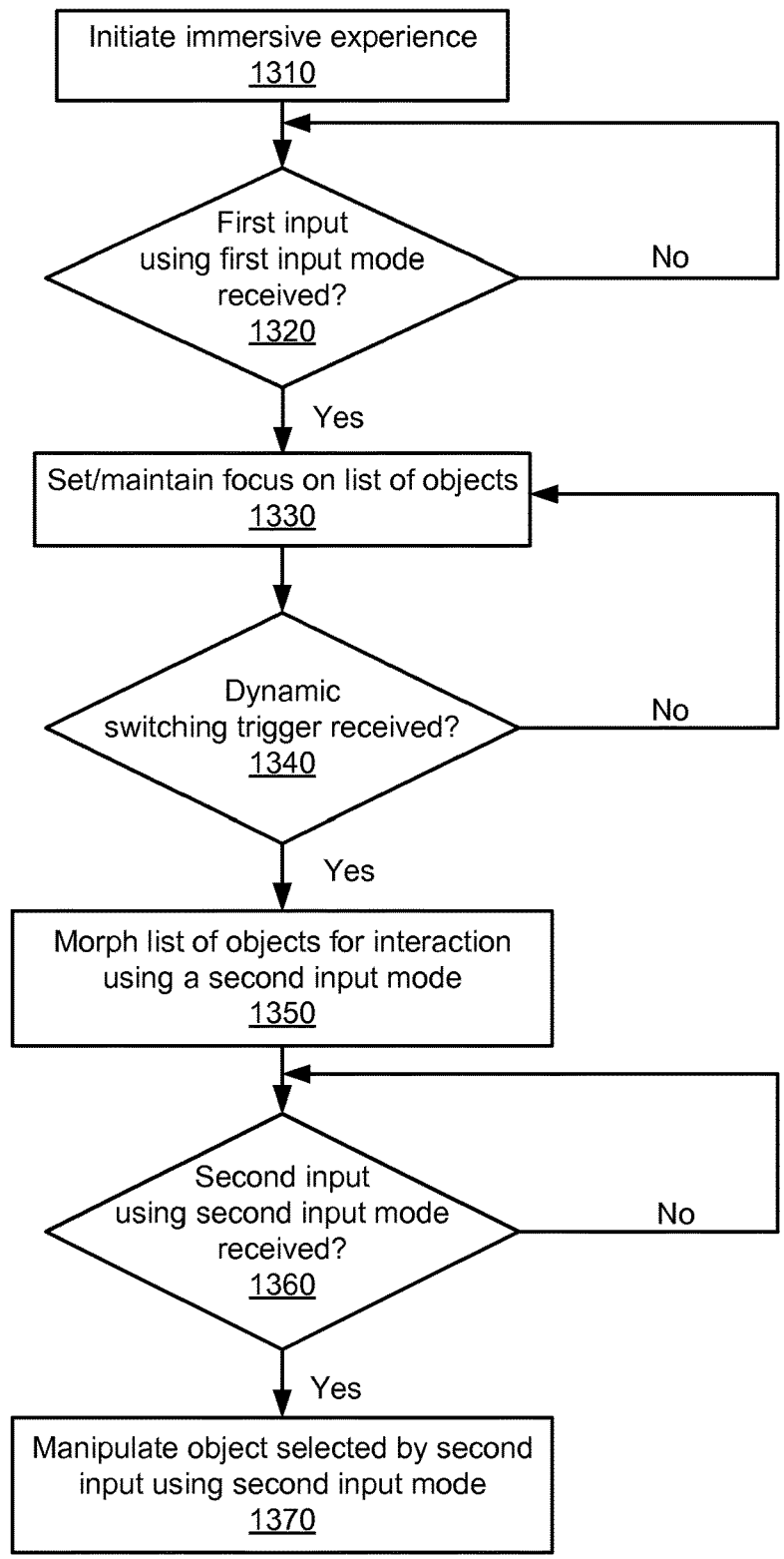
FIG. 13 is a flowchart of a method of dynamic switching between user input modes in a virtual reality environment, in accordance with embodiments as broadly described herein.

An example of dynamic switching, in accordance with embodiments as broadly described herein, is shown in FIG. 13. Once engaged in an immersive virtual experience, at block 1310, if a first input is received using a first input mode, at block 1320, then focus is established on a list of objects at block 1330. In some embodiments, the first input using the first input mode may be, for example, a gaze input (a head gaze and/or an eye gaze) at a user interface, such as a list of objects, that appears relatively far from the user in the virtual world. Once focus is established on the list of objects, if an input is received that triggers dynamic switching, the list of objects may be morphed to facilitate interaction using a second input mode that is different from the first input mode. In some embodiments, the input that triggers dynamic switching may be, for example, a hand and/or arm gesture captured by an image sensor of the HMD as discussed above, or other input action. In some embodiments, the input action that triggers dynamic switching may cause the input mode to switch from the gaze input mode (which established focus on the list of objects) to, for example, a reach and/or touch input mode which may facilitate interaction with individual object(s) in the list of objects.

In response to the dynamic switching trigger, the list of objects may be morphed to facilitate user interaction using a second input mode, such as, for example, a reach and/or touch input mode as discussed above, at block 1350. Morphing of the objects in the list may include, for example, visually morphing the objects so that they appear closer, and within reach of the user in the virtual world, adding and/or changing an image and/or text and/or other features associates with the objects, and the like, to facilitate user interaction with the objects using a reach and/or touch input mode. In response to receiving a second input using a second input mode, at block 1360, an object may be selected from the lists of objects and manipulated using the second input mode. For example, a user may touch one of the objects included in the list (which, after morphing is now within reach of the user in the virtual world) to select the object, and may then manipulate the object using a reach or touch input.

In this manner, objects, and lists of objects, may be visually positioned at a distance from the user in the virtual world that facilitates selection, interaction with and manipulation of the objects based on an input mode employed by the user.

Figure 14:
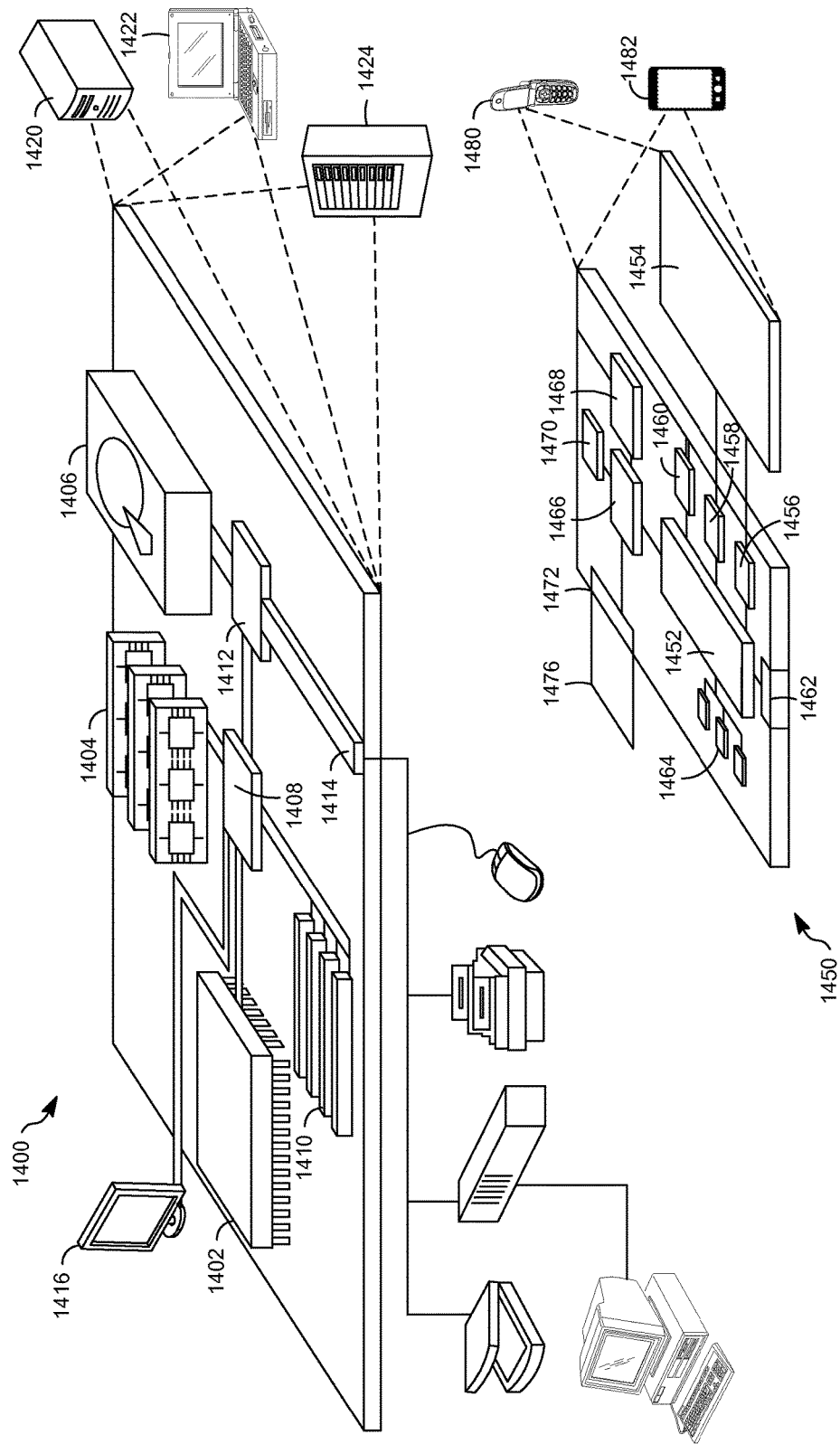
FIG. 14 shows an example of a computer device and a mobile computer device that can be used to implement the techniques described herein.

FIG. 14 shows an example of a generic computer device 1400 and a generic mobile computer device 1450, which may be used with the techniques described here. Computing device 1400 is intended to represent various forms of digital computers, such as laptops, desktops, tablets, workstations, personal digital assistants, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smart phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   displaying an immersive virtual environment including a plurality of virtual objects, each of the plurality of virtual objects being selectable and manipulatable in response to a plurality of input modes;
   detecting a first input implementing a first input mode of the plurality of input modes;
   selecting a first virtual object of the plurality of virtual objects, in response to the first input, and setting an active focus on the selected first virtual object for manipulation in the virtual environment;
   detecting a second input implementing a second input mode of the plurality of input modes;
   manipulating at least one virtual element of the first virtual object in response to the second input while the active focus is maintained on the first virtual object;
   detecting a third input implementing a third input mode of the plurality of input modes;
   comparing a priority value of the third input mode and a priority value of the first input mode; and
   based on the comparison, releasing the active focus on the first virtual object and shifting the active focus to a second virtual object of the plurality of virtual objects, or maintaining the active focus on the first virtual object, in response to the third input.

2. The method of claim 1, wherein releasing the active focus on the first virtual object and shifting the active focus to the second virtual object in response to the third input includes releasing the active focus on the first virtual object and shifting the active focus to the second virtual object in response to the third input when the priority value of the third input is greater than the priority value of the first input.

3. The method of claim 2, further comprising maintaining the active focus on the first virtual object when the priority value of the third input is less than the priority value of the first input.

4. The method of claim 1, each of the plurality of input modes having an associated priority value, the respective priority value associated with each of the plurality of input modes being preset or being set by a user in accordance with a user profile.

5. The method of claim 1, wherein the plurality of input modes includes a head gaze input mode, an eye gaze input mode, a point input mode, a reach input mode, and a gesture input mode.

6. The method of claim 1, wherein detecting the first input and selecting the first virtual object includes detecting a gaze input directed to the first virtual object to select the first virtual object for manipulation.

7. The method of claim 6, wherein detecting the second input includes:
   detecting a touch input on a touch sensitive surface of a handheld electronic device; and
   moving at least one virtual element of the selected first virtual object in response to the touch input.

8. The method of claim 7, wherein the touch input on the touch sensitive surface of the handheld electronic device is a touch and drag input, and wherein the movement of the at least one virtual element of the selected first virtual object corresponds to movement of the touch and drag input on the touch sensitive surface.

9. The method of claim 6, wherein detecting the gaze input directed to the first virtual object to select the first virtual object includes:
   receiving the gaze input at a far field display of the plurality of virtual objects including the first virtual object; and
   wherein receiving the second input includes:
   detecting a gesture input;
   recognizing the gesture input as a trigger for dynamic switching of the plurality of virtual objects from the far field display to a near field display;
   morphing an appearance of the plurality of virtual objects for near field display of the plurality of virtual objects; and
   displaying the morphed plurality of virtual objects in the near field display.

10. The method of claim 9, wherein morphing the appearance of the plurality of virtual objects for near field display of the plurality of virtual objects includes decreasing a virtual distance from a user to the plurality of virtual objects and at least one of changing a size of the plurality of virtual objects, changing an image associated with the plurality of virtual objects, changing text associated with the plurality of virtual objects, or changing menu items associated with the plurality of virtual objects as the plurality of virtual objects move from the far field display to the near field display.

11. The method of claim 10, further comprising detecting a fourth input, the fourth input including a reach gesture to select and manipulate a virtual object of the plurality of virtual objects displayed in the near field display.

12. The method of claim 1, wherein detecting the first input and selecting the first virtual object includes detecting a virtual beam directed from a handheld electronic device to the first virtual object to select the first virtual object, for manipulation of at least one virtual element of the first virtual object.

13. The method of claim 12, wherein detecting the second input includes:
   detecting a touch input on a touch sensitive surface of a handheld electronic device;
   detecting a drag of the touch input along the touch sensitive surface; and
   moving at least one virtual element of the selected first virtual object in response to the touch and drag input, movement of the at least one virtual element of the selected first virtual object corresponding to movement of the drag input along the touch sensitive surface of the handheld electronic device.

14. The method of claim 12, wherein detecting the second input includes:
   detecting a touch input on a touch sensitive surface of a handheld electronic device, and connecting the virtual beam between the handheld electronic device and the selected first virtual object in response to the detected touch input;
   detecting a physical movement of the handheld electronic device;
   moving at least one virtual element of the selected first virtual object in response to the detected physical movement of the handheld electronic device, movement of the at least one virtual element of the selected first virtual object corresponding to the detected physical movement of the handheld electronic device;
   detecting release of the touch input from the touch sensitive surface of the handheld electronic device; and
   releasing the active focus on the selected first virtual object in response to the detected release of the touch input to reposition the at least one virtual element of the selected first virtual object at a release point of the touch input.

15. An apparatus, comprising:
   a head mounted electronic device configured to be operably coupled with a handheld electronic device, the head mounted electronic device including a control system controlling operation of the head mounted electronic device to:
      display an immersive virtual environment including a plurality of virtual objects, each of the plurality of virtual objects being selectable and manipulatable in response to a plurality of input modes;
      detect a first input implementing a first input mode of the plurality of input modes;
      select a first virtual object, of the plurality of virtual objects, in response to the first input, and set an active focus on the selected first virtual object for manipulation in the virtual environment;
      detect a second input implementing a second input mode of the plurality of input modes;
      manipulate at least one virtual element of the first virtual object in response to the second input while the active focus is maintained on the first virtual object;
      detect a third input implementing a third input mode of the plurality of input modes;
      compare a priority value of the third input mode and a priority value of the first input mode; and
      based on the comparison, release the active focus on the first virtual object and shift the active focus to a second virtual object of the plurality of virtual objects, or maintain the active focus on the first virtual object, in response to the third input.

16. The apparatus of claim 15, each of the plurality of input modes having an associated priority value, the respective priority value associated with each of the plurality of input modes being preset or being set by a user in accordance with a user profile, the control system being further configured to:
   release the active focus on the first virtual object and shift the active focus to the second virtual object when the priority value of the third input is greater than the priority value of the first input; and
   maintain the active focus on the first virtual object when the priority value of the third input is less than the priority value of the first input.

17. The apparatus of claim 15, wherein the first input includes a gaze input directed to a far field display of the plurality of virtual objects including the first virtual object, and the second input includes a gesture triggering dynamic switching of the plurality of virtual objects from the far field display to a near field display, and wherein, in response to the second input, the control system is further configured to:
   morph an appearance of the plurality of virtual objects for near field display of the plurality of virtual objects; and
   display the morphed plurality of virtual objects in the near field display.

18. A computer program product embodied on a non-transitory computer-readable storage medium storing instructions that, when executed, cause a computing device to perform a process, the instructions comprising instructions to:
   display an immersive virtual environment including a plurality of virtual objects, each of the plurality of virtual objects being selectable and manipulatable in response to a plurality of input modes;
   detect a first input implementing a first input mode of the plurality of input modes;
   select a first virtual object, of the plurality of virtual objects, in response to the first input, and set an active focus on the selected first virtual object for manipulation of the first virtual object in the virtual environment;
   detect a second input implementing a second input mode of the plurality of input modes;
   manipulate at least one virtual element of the first virtual object in response to the second input while the active focus is maintained on the first virtual object;
   detect a third input implementing a third input mode of the plurality of input modes;
   compare a priority value of the third input mode and a priority value of the first input mode; and
   based on the comparison, release the active focus on the first virtual object and shift the active focus to a second virtual object of the plurality of virtual objects, or maintain the active focus on the first virtual object, in response to the third input.

19. The computer program product embodied on the non-transitory computer-readable storage medium of claim 18, each of the plurality of input modes having an associated priority value, the respective priority value associated with each of the plurality of input modes being preset or being set by a user in accordance with a user profile.

20. The computer program product embodied on the non-transitory computer-readable storage medium of claim 18, the active focus on the first virtual object being released and shifted to the second virtual object when the priority value of the third input is greater than the priority value of the first input, and the active focus on the first virtual object being maintained when the priority value of the third input is less than the priority value of the first input.

21. The computer program product embodied on the non-transitory computer-readable storage medium of claim 18, wherein the first input is directed to a far field display of the plurality of virtual objects, and the second input triggers a dynamic switching of the plurality of virtual objects from the far field display to a near field display, in response to the second input, the instructions also including instructions to:
   morph an appearance of the plurality of virtual objects for near field display of the plurality of virtual objects; and display the morphed plurality of virtual objects in the near field display.

22. The computer program product embodied on the non-transitory computer-readable storage medium of claim 21, wherein the morphed appearance of the plurality of virtual objects for near field display of the plurality of virtual objects includes a decrease in a virtual distance from a user to the plurality of virtual objects and at least one of a change in a size of the plurality of virtual objects, a change in an image associated with the plurality of virtual objects, a change in text associated with the plurality of virtual objects, or a change menu items associated with the plurality of virtual objects as the plurality of virtual objects move from the far field display to the near field display.

* * * * *